United States Patent
Yeh et al.

(10) Patent No.: US 10,191,840 B2
(45) Date of Patent: Jan. 29, 2019

(54) MAPPING TABLE UPDATING METHOD, MEMORY CONTROL CIRCUIT UNIT AND MEMORY STORAGE DEVICE

(71) Applicant: PHISON ELECTRONICS CORP., Miaoli (TW)

(72) Inventors: Chih-Kang Yeh, Kinmen County (TW); Chang-Han Hsieh, Taichung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 622 days.

(21) Appl. No.: 14/829,654

(22) Filed: Aug. 19, 2015

(65) Prior Publication Data

US 2017/0017570 A1    Jan. 19, 2017

(30) Foreign Application Priority Data

Jul. 13, 2015   (TW) .............................. 104122494 A

(51) Int. Cl.
  *G06F 12/00*    (2006.01)
  *G06F 13/00*    (2006.01)
  *G06F 12/02*    (2006.01)
  *G06F 3/06*    (2006.01)
  *G06F 12/1009*    (2016.01)

(52) U.S. Cl.
  CPC ........ *G06F 12/0246* (2013.01); *G06F 3/0608* (2013.01); *G06F 3/0638* (2013.01); *G06F 3/0679* (2013.01); *G06F 12/1009* (2013.01); *G06F 2212/2022* (2013.01)

(58) Field of Classification Search
  CPC ............. G06F 12/1009; G06F 12/1027; G06F 12/1045; G06F 2212/68; G06F 2212/682
  See application file for complete search history.

(56) References Cited

U.S. PATENT DOCUMENTS

| | | | |
|---|---|---|---|
| 5,530,673 A * | 6/1996 | Tobita ................... | G06F 3/0601 365/185.04 |
| 6,078,520 A * | 6/2000 | Tobita ................. | G06F 11/1433 365/185.09 |
| 6,886,085 B1 * | 4/2005 | Shuf ................... | G06F 9/30047 711/143 |
| 7,412,585 B2 * | 8/2008 | Uemura .............. | G06F 12/0223 710/9 |
| 9,355,028 B2 * | 5/2016 | Cheng ................. | G06F 12/0246 |

(Continued)

*Primary Examiner* — Sean D Rossiter
(74) *Attorney, Agent, or Firm* — JCIPRNET

(57) ABSTRACT

A mapping table updating method for a rewritable non-volatile memory module is provided. The method includes: allocating a mapping table storage area for storing a physical address-logical address mapping table in a buffer memory. The method also includes: determining whether a remaining storage space of the mapping table storage area is less than a threshold. If the remaining storage space is less than the threshold, mapping information of the physical address-logical address mapping table stored in the mapping table storage area is updated into at least one logical address-physical address mapping table, and the mapping information of the physical address-logical address mapping table stored in the mapping table storage area is cleared. The method also includes: storing updated mapping information corresponding to a programmed active physical erasing unit into the mapping table storage area.

21 Claims, 14 Drawing Sheets

(56) References Cited

U.S. PATENT DOCUMENTS

| | | | | |
|---|---|---|---|---|
| 2003/0101327 A1* | 5/2003 | Beck | ............... | G06F 12/0246 |
| | | | | 711/206 |
| 2005/0223154 A1* | 10/2005 | Uemura | ............... | G06F 12/0223 |
| | | | | 711/4 |
| 2008/0263114 A1* | 10/2008 | Nath | ............... | G06F 17/30327 |
| 2010/0174869 A1* | 7/2010 | Gorobets | ............... | G06F 12/0246 |
| | | | | 711/135 |
| 2011/0072199 A1* | 3/2011 | Reiter | ............... | G06F 13/14 |
| | | | | 711/103 |
| 2013/0326121 A1* | 12/2013 | Cheng | ............... | G06F 12/0246 |
| | | | | 711/103 |
| 2015/0277785 A1* | 10/2015 | Liang | ............... | G06F 12/0246 |
| | | | | 711/103 |
| 2017/0017588 A1* | 1/2017 | Frid | ............... | G06F 13/18 |
| 2017/0038977 A1* | 2/2017 | Yeh | ............... | G06F 3/0608 |
| 2017/0192716 A1* | 7/2017 | Ko | ............... | G06F 3/0608 |

\* cited by examiner

MAPPING TABLE UPDATING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 104122494, filed on Jul. 13, 2015. The entirety of the above-mentioned patent application is hereby incorporated by reference herein and made a part of this specification.

BACKGROUND

Technical Field

The present invention relates to a mapping table updating method, and more particularly, to a mapping table updating method for a logical address-physical address mapping table of a rewritable non-volatile memory module, a memory control circuit unit and a memory storage device using the method.

Description of Related Art

The growth of digital cameras, mobile phones, and MP3 players has been rapid in recent years. Consequently, the consumers' demand for storage media has increased tremendously. In recent years, a rewritable non-volatile memory has become an import part of the electronic industries because the rewritable non-volatile memory is capable of providing features such as data non-volatility, low power consumption, small volume, non-mechanical structure and high read/write speed. For instance, a solid-state drive utilizing a flash memory as a storage media has been widely applied in a computer host as a main hard disk for enhancing access efficiency of computer.

A memory storage device using the rewritable non-volatile memory module as a storage medium establishes a logical address-physical address mapping table to record mapping information between logical units and physical units, so that a host system may successfully access data in the rewritable non-volatile memory module. For example, if the host system intends to store data, the memory storage device may program the data into the physical units, and update a mapping relation between the logical units that the data belongs to and the physical units programmed with the data into the logical address-physical address mapping table. Specifically, the memory storage device may load the logical address-physical address mapping table corresponding to the logical units into a buffer memory for updating.

Because the logical units to which the host system intends to store data each time may correspond to different logical address-physical address mapping tables, in order to avoid frequently updating the logical address-physical address mapping table, the memory storage device allocates a temporary storage area for storing a temporarily-stored mapping table, programs the data to be written into an active physical erasing unit, and stores the mapping relation between the logical units to which the data belongs and the active physical erasing unit into the temporary storage area. The mapping information of the temporarily-stored mapping table stored in the temporary storage area is updated into the logical address-physical address mapping table all at once if the temporary storage area is full.

However, data volumes actually programmed into the physical units may be different from one another (e.g., in the case where the data is compressed). In other words, each of the physical units may be mapped to different amounts of the logical units. Therefore, each of sizes of the mapping information corresponding to the physical units stored in the temporarily-stored mapping table may also be different from one another. Accordingly, if the temporary storage area is full, a situation where the active physical erasing unit is not fully written may occur. In this case, since the temporary storage area is already full, a control circuit of the memory storage device updates the mapping information of the temporarily-stored mapping table stored in the temporary storage area into the logical address-physical address mapping table, and programs data to be subsequently written into the physical programming units not being programmed in the active physical erasing unit according to a programming sequence.

For example, the physical erasing unit of a Multi Level Cell (MLC) NAND-type flash memory includes a lower physical programming unit (also known as a fast-speed page) and an upper physical programming unit (also known as a slow-speed page). After updating the mapping information of the temporarily-stored mapping table into the logical address-physical address mapping table, if the data to be written are programmed into the upper physical programming units of the active physical erasing unit according to the programming sequence, a programming error (e.g., an unexpected power loss) may occur and lead to errors on the data of the programmed lower physical programming units corresponding to said upper physical programming units. Worth yet, because the logical address-physical address mapping table is already updated, old address of said data can no longer be obtained, namely, the data cannot be restored.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

A mapping table updating method, a memory control circuit unit and a memory storage device are provided according to the exemplary embodiments of the present invention, which are capable updating a logical address-physical address mapping table more efficiently while preventing the situation where the programmed data cannot be restored due to programming failures of other physical programming units after updating the logical address-physical address mapping table.

A mapping table updating method for a memory storage device is proposed according to an exemplary embodiment of the present invention. The memory storage device has a rewritable non-volatile memory module. The rewritable non-volatile memory module has a plurality of physical erasing units and each of the physical erasing units has a plurality of physical programming units. The mapping table updating method includes: allocating a mapping table storage area for storing a physical address-logical address mapping table in a buffer memory; determining whether a remaining storage space of the mapping table storage area is less than a first threshold; if determining that the remaining storage space is less than the first threshold, updating mapping information of the physical address-logical address mapping table stored in the mapping table storage area into at least one logical address-physical address mapping table; clearing the mapping information of the physical address-logical address mapping table stored in the mapping table storage area; and programming a plurality of writing data belonging to a plurality of logical programming units into the physical programming units of an active physical erasing unit among the physical erasing units, establishing a plurality of updated mapping information between the physical programming units programmed with the writing data and the logical programming units, and storing the updated mapping information into the mapping table storage area.

A memory control circuit unit configured to control a rewritable non-volatile memory module of a memory storage device is proposed according to an exemplary embodiment of the present invention. The rewritable non-volatile memory module has a plurality of physical erasing units and each of the physical erasing units has a plurality of physical programming units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to allocate a mapping table storage area for storing a physical address-logical address mapping table in a buffer memory. Also, the memory management circuit is further configured to determine whether a remaining storage space of the mapping table storage area is less than a first threshold. If determining that the remaining storage space is less than the first threshold, the memory management circuit is further configured to update mapping information of the physical address-logical address mapping table stored in the mapping table storage area into at least one logical address-physical address mapping table. Furthermore, the memory management circuit is further configured to clear the mapping information of the physical address-logical address mapping table stored in the mapping table storage area. In addition, the memory management circuit is further configured to program a plurality of writing data belonging to a plurality of logical programming units into the physical programming units of an active physical erasing unit among the physical erasing units, establish a plurality of updated mapping information between the physical programming units programmed with the writing data and the logical programming units, and store the updated mapping information into the mapping table storage area.

A memory storage device including a connection interface unit, a rewritable non-volatile memory module and a memory control circuit unit is provided according to an exemplary embodiment of the invention. The connection interface unit is configured to couple to a host system. The rewritable non-volatile memory module includes a plurality of physical erasing units. The memory control circuit unit is coupled to the connection interface unit and the rewritable non-volatile memory module. The memory control circuit unit is configured to allocate a mapping table storage area for storing a physical address-logical address mapping table in a buffer memory. Also, the memory control circuit unit is further configured to determine whether a remaining storage space of the mapping table storage area is less than a first threshold. If determining that the remaining storage space is less than the first threshold, the memory control circuit unit is further configured to update mapping information of the physical address-logical address mapping table stored in the mapping table storage area into at least one logical address-physical address mapping table. Furthermore, the memory control circuit unit is further configured to clear the mapping information of the physical address-logical address mapping table stored in the mapping table storage area. In addition, the memory control circuit unit is further configured to program a plurality of writing data belonging to a plurality of logical programming units into the physical programming units of an active physical erasing unit among the physical erasing units, establish a plurality of updated mapping information between the physical programming units programmed with the writing data and the logical programming units, and store the updated mapping information into the mapping table storage area.

Based on the above, the efficiency for updating the logical address-physical address mapping table may be improved while preventing the situation where the programmed data cannot be restored due to the programming failures of other physical programming units after updating the logical address-physical address mapping table.

To make the above features and advantages of the present disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention.

DESCRIPTION OF THE EMBODIMENTS

Figure 1:
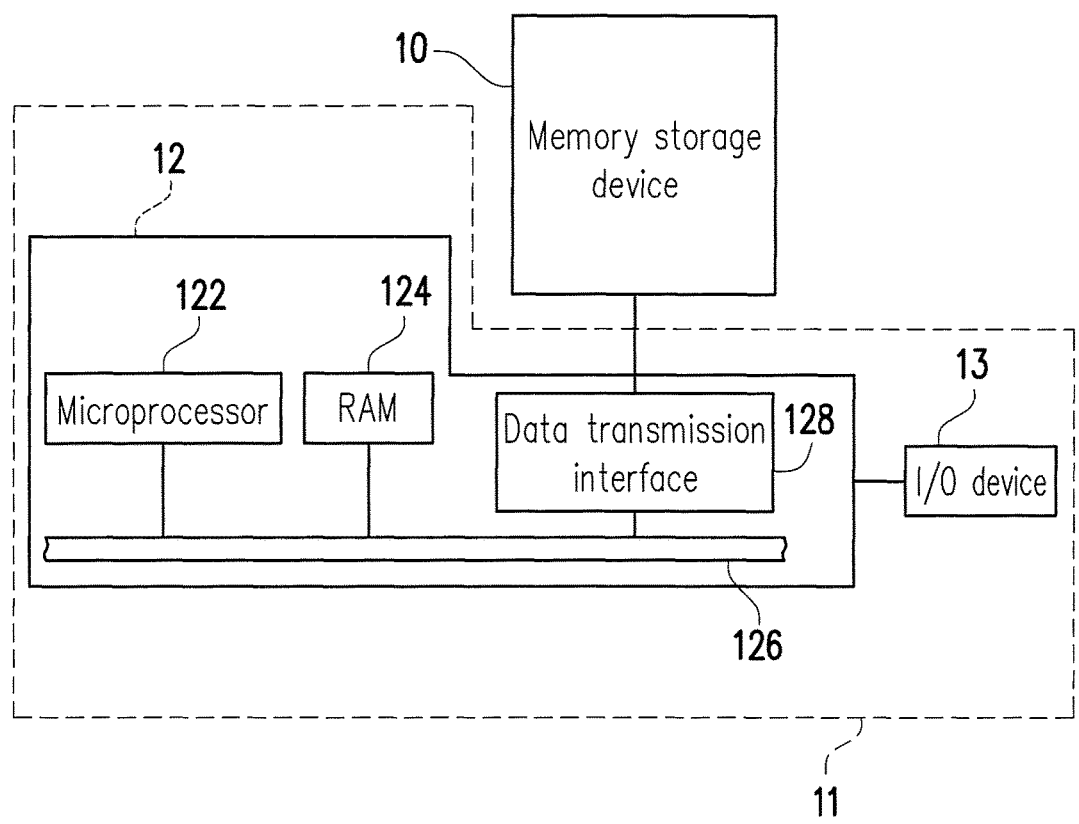
FIG. 1 is a schematic diagram illustrating a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data into the memory storage device or read data from the memory storage device.

Figure 2:
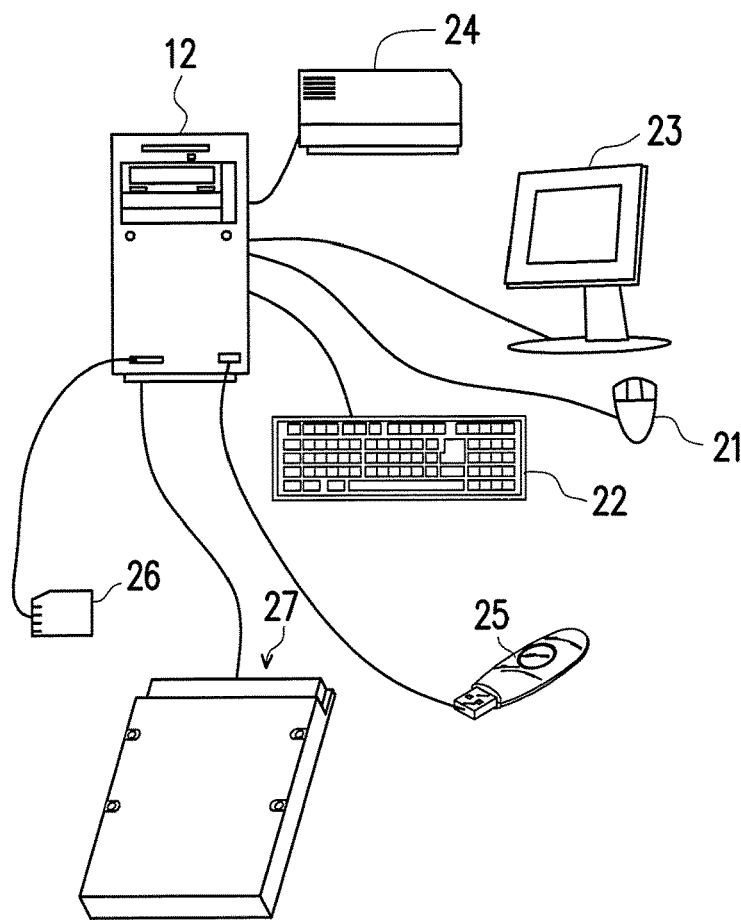
FIG. 2 is a schematic diagram illustrating a computer, an input/output device and a memory storage device according to an exemplary embodiment.

FIG. 1 is a schematic diagram illustrating a host system and a memory storage device according to an exemplary embodiment, and FIG. 2 is a schematic diagram illustrating a computer, an input/output device and a memory storage device according to an exemplary embodiment.

Referring to FIG. 1, a host system 11 includes a computer 12 and an input/output (I/O) device 13. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In the present exemplary embodiment, a memory storage device 10 is electrically connected to other devices of the host system 11 through the data transmission interface 128. By using the microprocessor 122, the random access memory 124 and the Input/Output (I/O) device 13, data may be written into the memory storage device 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
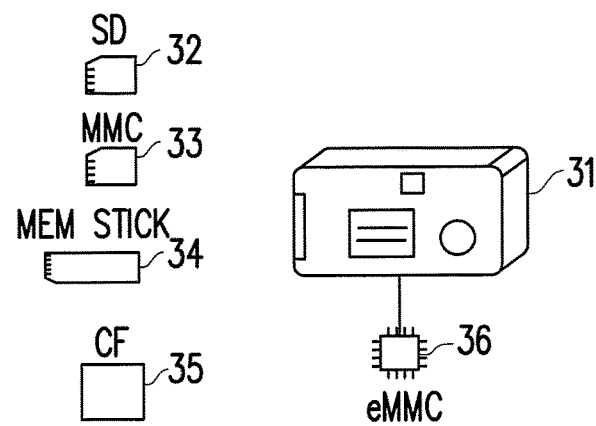
FIG. 3 is a schematic diagram illustrating a host system and a memory storage device according to an exemplary embodiment.

FIG. 3 is a schematic diagram illustrating a host system and a memory storage device according to an exemplary embodiment.

Generally, the host system 11 may substantially be any system capable of storing data with the memory storage device 10. Even though the host system 11 is illustrated as a computer system in the present exemplary embodiment, however, in another exemplary embodiment of the present invention, the host system 11 may be a digital camera, a video camera, a telecommunication device, an audio player, or a video player. For example, if the host system is a digital camera (video camera) 31 in FIG. 3, the rewritable non-volatile memory storage device may be a SD card 32, a MMC card 33, a memory stick 34, a CF card 35 or an embedded storage device 36 (as shown in FIG. 3). The embedded storage device 36 includes an embedded MMC (eMMC). It should be mentioned that the eMMC is electrically connected to a substrate of the host system, directly.

Figure 4:
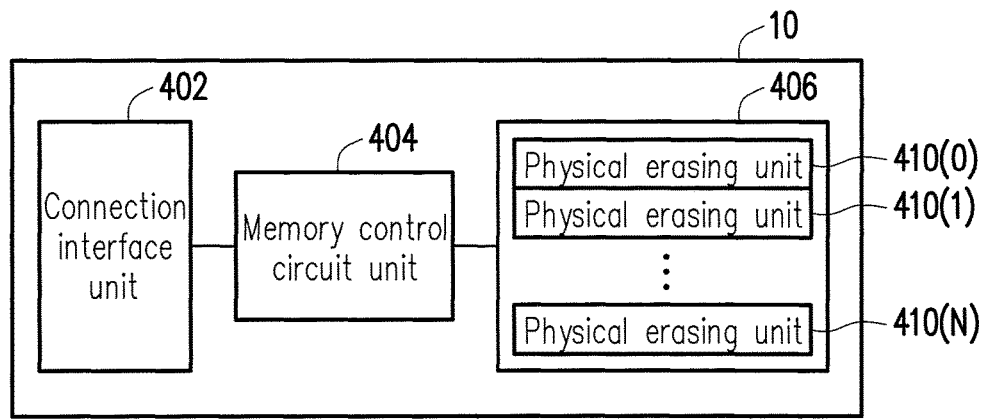
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. However, the invention is not limited thereto, and the connection interface unit 402 may also be compatible with Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or distributed outside of a chip containing the memory control circuit unit.

The memory control circuit unit 404 is configured to execute a plurality of logic gates or control commands which are implemented in a hardware form or in a firmware form, so as to execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 bytes. However, in other exemplary embodiments, the data bit area may also include more or less of the physical access addresses, and an amount and a size of the physical access addresses are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a Multi Level Cell (MLC) NAND flash memory module (i.e., a flash memory module capable of storing two data bits in one memory cell). However, the disclosure is not limited thereto. The rewritable non-volatile memory module 406 may also be a Single Level Cell (SLC) NAND flash memory module, (i.e., a flash memory module capable of storing one data bit in one memory cell), a Trinary Level Cell (TLC) NAND flash memory module (i.e., a flash memory module capable of storing three data bits in one memory cell), other flash memory modules or any memory module having the same features.

Figure 5:
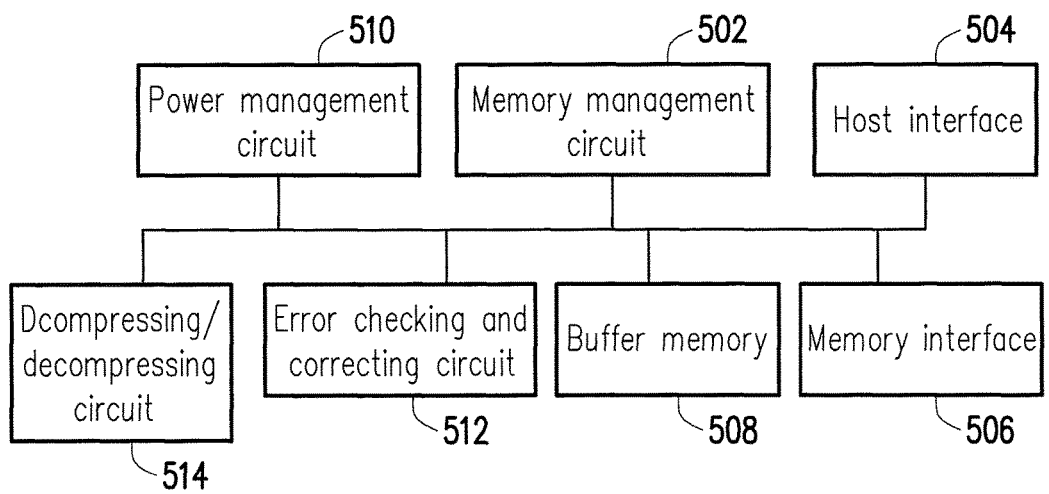
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. During operations of the memory storage device 10, the control commands are executed to execute various operations such as writing, reading and erasing data.

In the present exemplary embodiment, the control commands of the memory management circuit 502 are implemented in a form of a firmware. For instance, the memory management circuit 502 has a microprocessor unit (not illustrated) and a ROM (not illustrated), and the control commands are burned into the ROM. If the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). Particularly, the read only memory has a boot code, which is executed by the microprocessor unit to load the control commands stored in the rewritable non-volatile memory module 406 to the random access memory of the memory management circuit 502 if the memory control circuit unit 404 is enabled. Thereafter, the control commands are executed by the microprocessor unit to execute operations of writing, reading or erasing data.

The host interface 504 is coupled to the memory management circuit 502 and configured to couple to the connection interface unit 402, so as to receive and identify commands and data sent from the host system 11. In other words, the commands and the data sent from the host system 11 are passed to the memory management circuit 502 through the host interface 504. In the present exemplary embodiment, the host interface 504 is compatible with the SATA standard. However, it should be understood that the present invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506.

In an exemplary embodiment, the memory control circuit unit 404 further includes a buffer memory 508, a power management circuit 510, an error checking and correcting circuit 512, and a data compressing/decompressing circuit 514.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and configured to execute an error checking and correcting process to ensure the correctness of data. Specifically, if the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, if the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

The data compressing/decompressing circuit 514 is coupled to the memory management circuit 502. Herein, the data compressing/decompressing circuit 514 is configured to compress the data to be written into the rewritable non-volatile memory module 406 and configured to decompress the data read from the rewritable non-volatile memory module 406. For example, the data compressing/decompressing circuit 514 includes a compressor and a decompressor. The compressor is configured to locate a data redundancy existed in original data, remove the located data redundancy, and encode the rest of necessary data and then output an encoded result (i.e., a compressed data). The decompressor is configured to decode the read compressed data according to given steps and output a decoded result (i.e., a decompressed data). In the present exemplary embodiment, the data compressing/decompressing circuit 514 compresses data by using a lossless compression algorithm, so that the compressed data may be restored later.

Figure 6A:
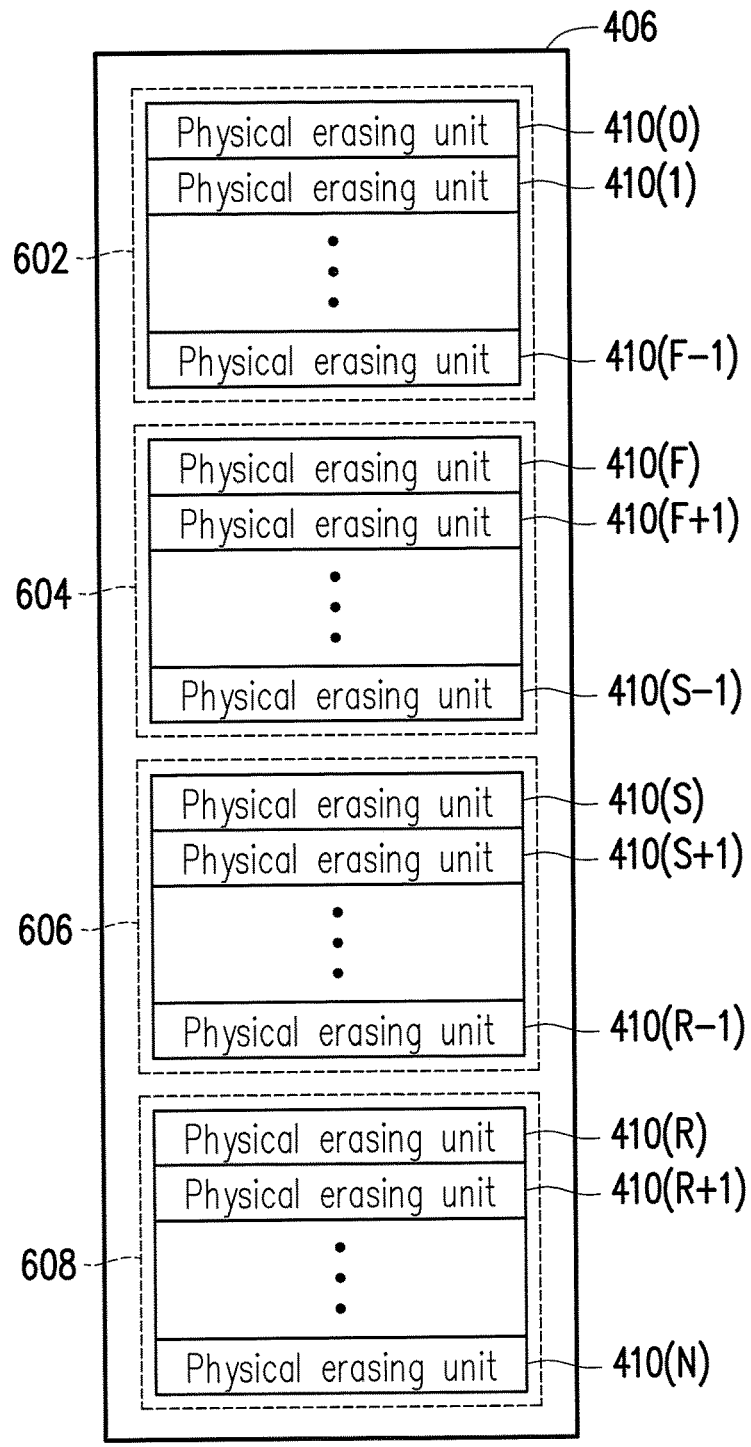
FIG. 6A and FIG. 6B are schematic diagrams illustrating an example of managing the physical erasing units according to an exemplary embodiment.
Figure 6B:
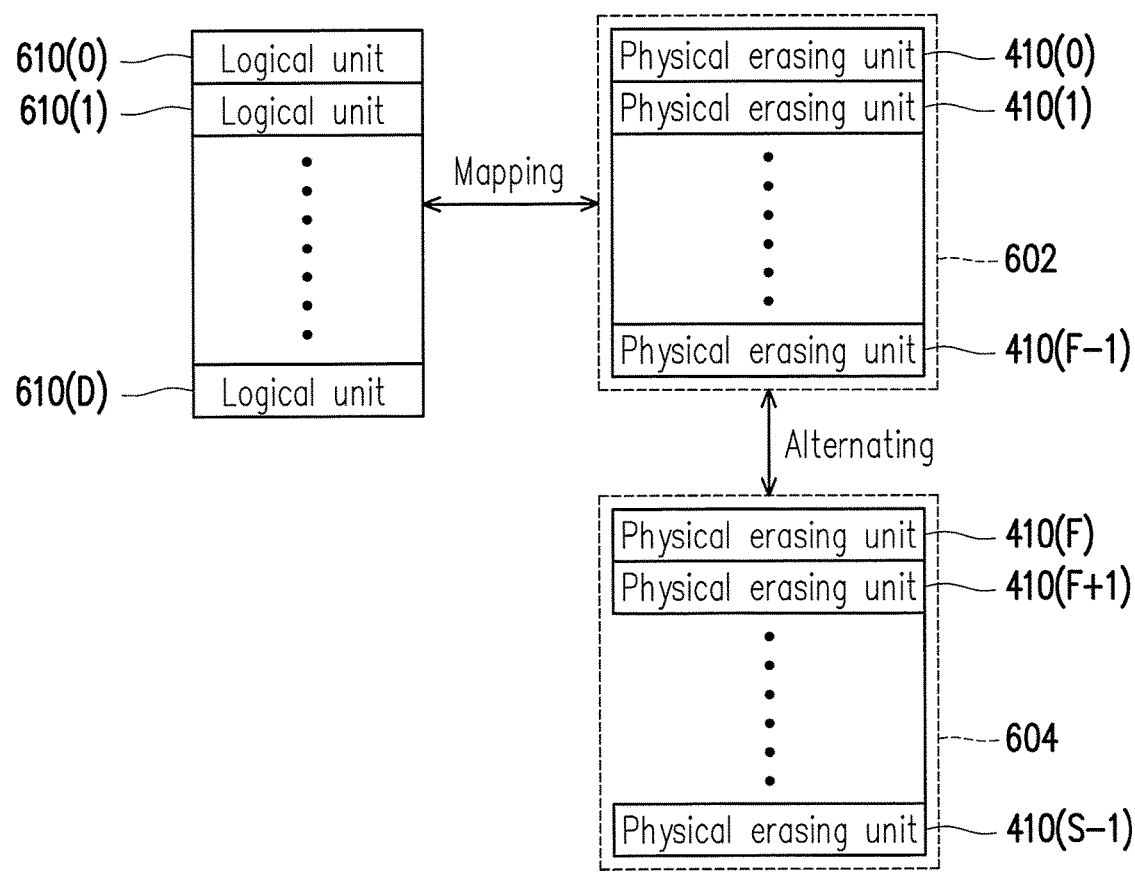

FIG. 6A and FIG. 6B are schematic diagrams illustrating an example of managing the physical erasing units according to an exemplary embodiment.

It should be understood that terms, such as "select", "get", "group", "divide", "associate" and so forth, are logical concepts which describe operations in the physical erasing units of the rewritable non-volatile memory module 106. That is, the physical erasing units of the rewritable non-volatile memory module are logically operated, but actual positions of the physical units of the rewritable non-volatile memory module are not changed.

Referring to FIG. 6A, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, if the write command and the data to be written are received from the host system 11, the memory management unit 502 selects the physical erasing units from the spare area 604, and writes the data into the selected physical erasing units in order to substitute the physical erasing units in the data area 602.

The physical erasing units logically belonging to the system area 606 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 608 are used in a bad physical erasing unit replacement procedure for replacing damaged physical erasing units. More specifically, if available physical erasing units still exists in the replacement area 608 if the physical erasing units of the data area 602 are damaged, the memory management circuit 502 gets the available physical erasing units from the replacement area 608 for replacing the damaged physical erasing units.

Particularly, the numbers of the physical erasing units in the data area 602, the spare area 604, the system 606 and the replacement area 608 may be different from one another according to the different memory specifications. In addition, it should be understood that, during operations of the memory storage device 10, grouping relations of the physical erasing units for associating with the data area 602, the spare area 604, the system area 606, and replacement area 608 may be dynamically changed. For example, if the damaged physical erasing units in the spare area 604 are replaced by the physical erasing units in the replacement area 608, the physical erasing units originally from the replacement area 608 are then associated with the spare area 604.

Referring to FIG. 6B, as described above, the physical erasing units of the data area 602 and the spare area 604 are configured for storing data written from the host system 11 in an alternating manner. In the present exemplary embodiment, the memory control circuit unit 404 (or the memory management circuit 502) may assign logical addresses 610(0) to 610(D) to the host system 11 for mapping a part of physical erasing units 410(0) to 410(F−1) in the data area 602, so as to facilitate in data access on the physical erasing units which store the data in the alternating manner. Particularly, the host system 11 may access the data in the data area 602 through the logical addresses 610(0) to 610(D). Further, the memory control circuit unit 404 (or the memory management circuit 502) establishes a logical address-physical address mapping table to record a mapping relation between logical units and physical units. The logical address-physical address mapping table may also record, for example, various corresponding relations between logical and physical entities, such as a mapping relation between the logical addresses and the physical erasing units, a mapping relation between the logical addresses and the physical programming units, a mapping relation between the logical programming units and the physical erasing units and/or a mapping relation between the logical programming units and the physical programming units, which are not particularly limited by the present invention.

In the present exemplary embodiment, the rewritable non-volatile memory module 406 of the memory storage device 10 may be managed based on the physical programming units (also known as page based). For example, if the write command is executed, regardless of which logical programming unit is the data currently written into, the memory control circuit unit 404 (or the memory management unit 502) writes the data in a manner of one physical programming unit after another physical programming unit (also known as a random writing mechanism). More specifically, the memory control circuit unit 404 (or the memory management circuit 502) gets one empty physical erasing unit from the spare area 604 as an active physical erasing unit for writing data. Further, if the active physical erasing unit is fully written, the memory control circuit unit 404 (or the memory management circuit 502) gets another empty physical erasing unit from the spare area 604 as the active physical erasing unit in order to continue writing the data corresponding to the write command from the host system 11.

In the present exemplary embodiment, the memory control circuit unit 404 (or the memory management circuit 502) allocates a mapping table storage area for storing a physical address-logical address mapping table in the buffer memory 508, so as to record a mapping relation between the programmed active physical erasing unit and the logical programming units to which the data belongs. In the present exemplary embodiment, the data programmed into the physical programming unit may be compressed or not compressed. Therefore, one physical programming unit may be mapped to one or more logical programming units. It is assumed that in the case where one physical programming unit is mapped to one logical programming unit (e.g., the data programmed into the active physical erasing unit is not compressed), if the active physical erasing unit is fully written, the size of updated mapping information formed by multiple mapping relations between multiple physical programming units of the active physical erasing unit and multiple logical programming units is exactly 1 unit. The memory control circuit unit 404 (or the memory management circuit 502) may allocate 4 units of storage space as the mapping table storage area for storing the physical address-logical address mapping table in the buffer memory 508. However, based on actual requirements, more or less of the storage area may also be allocated as the mapping table storage area, which is not particularly limited in the invention.

Figure 7A:
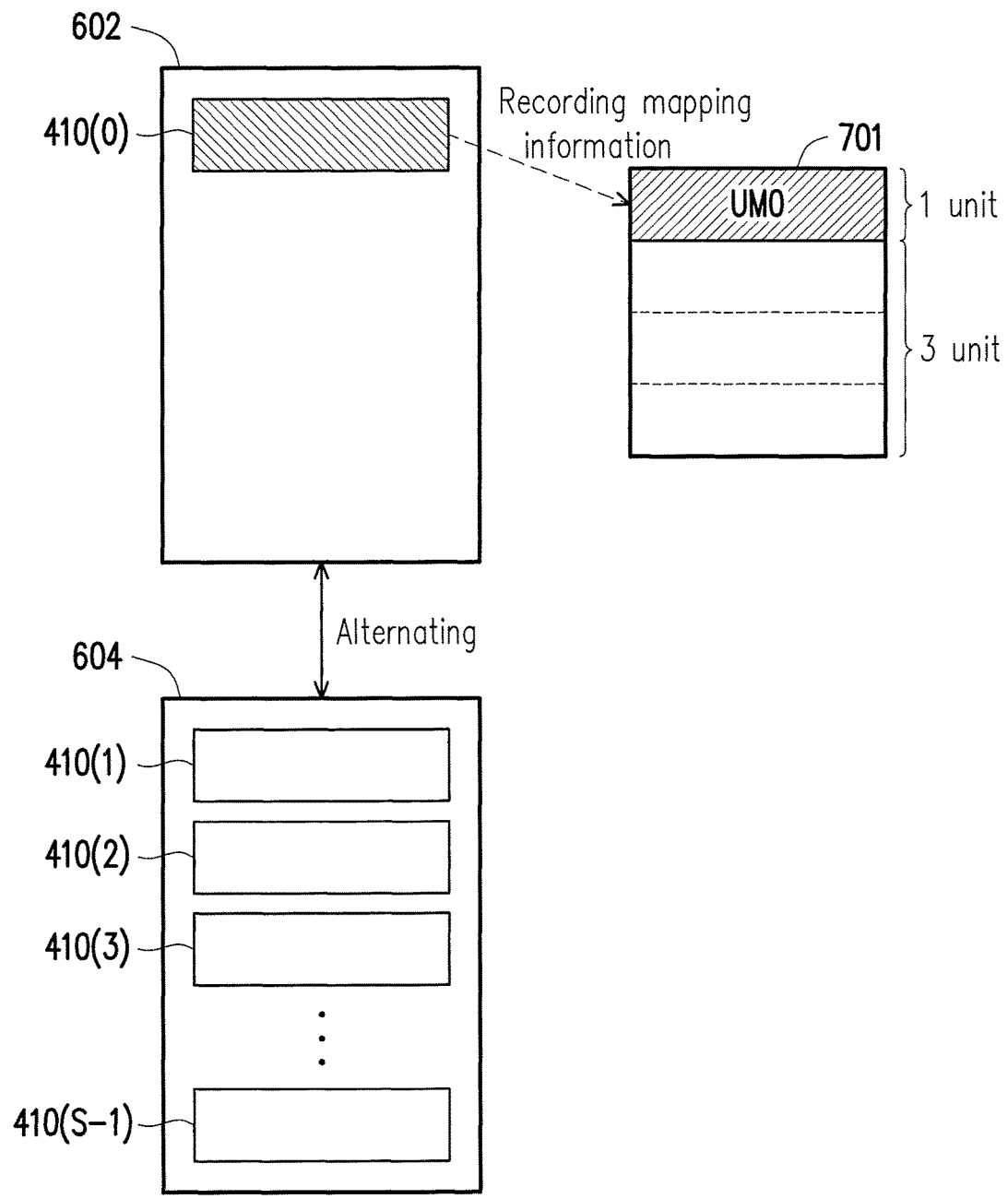
FIG. 7A, FIG. 7B and FIG. 7C are schematic diagrams illustrating an example of storing the updated mapping information of the active physical erasing unit into the mapping table storage area according to an exemplary embodiment.
Figure 7B:
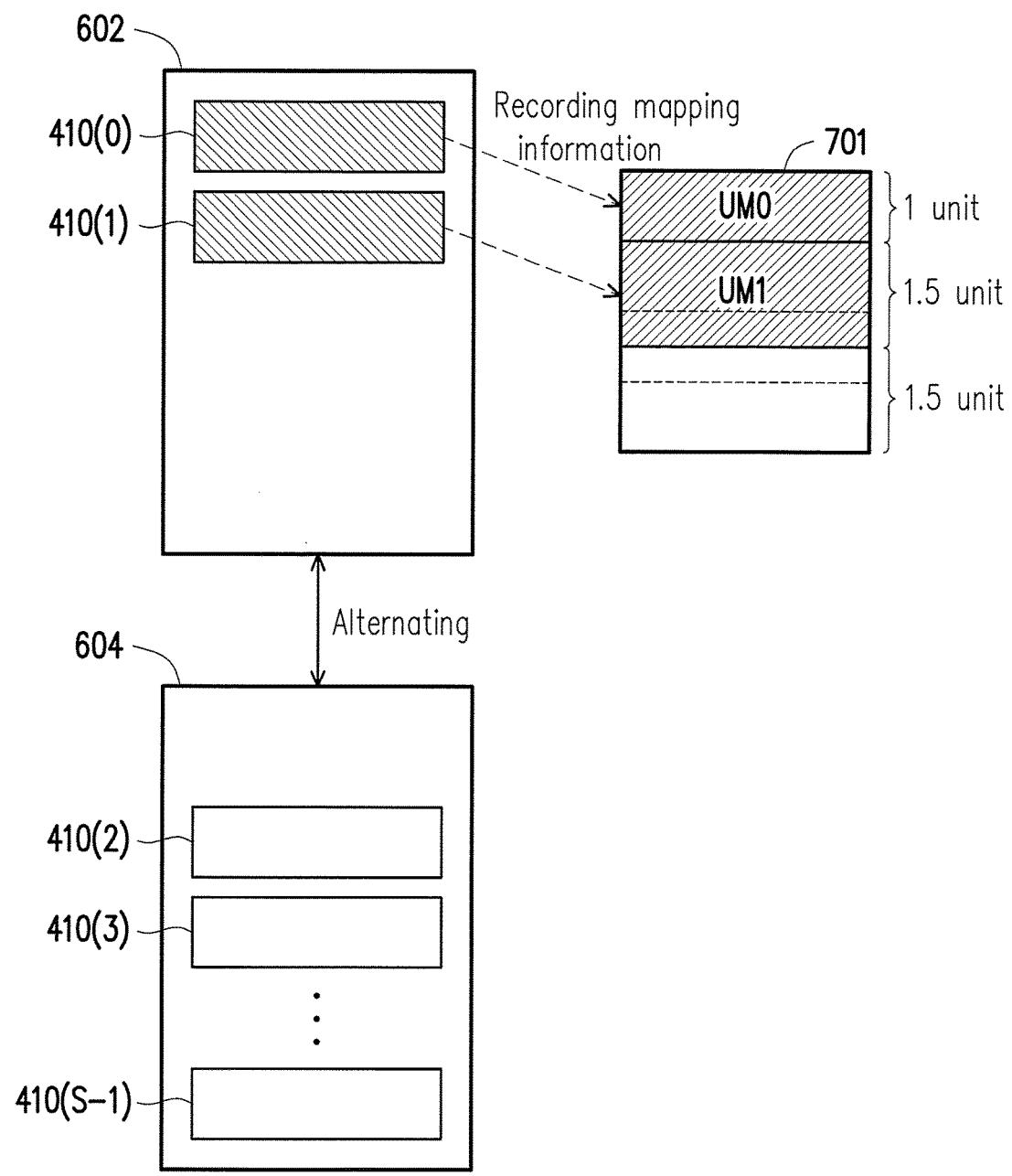
Figure 7C:
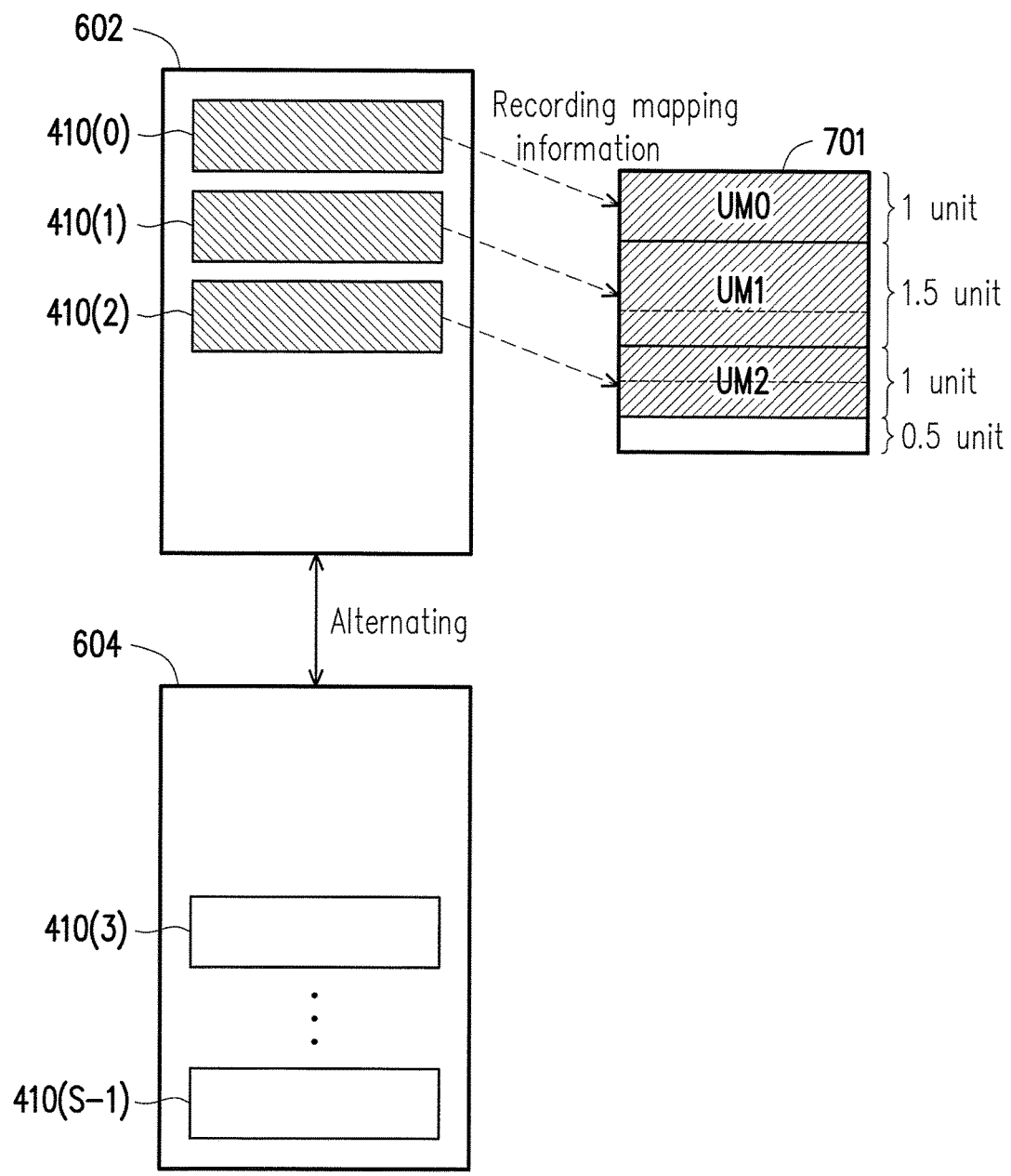

FIG. 7A, FIG. 7B and FIG. 7C are schematic diagrams illustrating an example of storing the updated mapping information of the active physical erasing unit into the mapping table storage area according to an exemplary embodiment.

Referring to FIG. 7A, for illustrative convenience, the present exemplary embodiment is described by using an example where none of the physical erasing units are associated to the data area to begin with. The memory control circuit unit 404 (or the memory management circuit 502) allocates 4 units of storage space as a mapping table storage area 701 for storing the physical address-logical address mapping table in the buffer memory 508. If the memory control circuit unit 404 (or the memory management circuit 502) receives the write command for writing data into the logical addresses from the host system 11, the memory control circuit unit 404 (or the memory management circuit 502) gets one empty physical erasing unit (i.e., the physical erasing unit 410(0)) from the spare area 604 as an active physical erasing unit. The memory control circuit unit 404 (or the memory management circuit 502) programs the data into the physical programming units of the physical erasing unit 410(0) according to a programming sequence of the physical programming units of the active physical erasing unit. The memory control circuit unit 404 (or the memory management circuit 502) then establishes updated mapping information according to mapping relations between the programmed physical programming units in the physical erasing unit 410(0) and the logical programming units to which the data belongs, and stores the updated mapping information into the mapping table storage area 701. If the active physical erasing unit (i.e., the physical erasing unit 410(0)) is fully written, the memory control circuit unit 404 (or the memory management circuit 502) gets another empty physical erasing unit 410(1) from the spare area 604 as a new active physical erasing unit for storing data of a subsequent write command.

In the present exemplary embodiment, if the active physical erasing unit is fully written and it is required to select another empty physical erasing unit from the spare area 604 as the new active physical erasing unit, the memory control circuit unit 404 (or the memory management circuit 502) determines whether it is required to update the logical address-physical address mapping table. Specifically, the memory control circuit unit 404 (or the memory management circuit 502) estimates whether a remaining storage space of the mapping table storage area 701 is still capable of completely storing the updated mapping information corresponding to one physical erasing unit, and thereby determines whether it is required to update the mapping information of the physical address-logical address mapping table stored in the mapping table storage area 701 into the logical address-physical address mapping table. In the present exemplary embodiment, the memory control circuit unit 404 (or the memory management circuit 502) determines whether the remaining storage space of the mapping table storage area 701 is less than a first threshold. If the remaining storage space is less than the first threshold, the memory control circuit unit 404 (or the memory management circuit 502) loads the corresponding logical address-physical address mapping table into the buffer memory 508 according to the mapping information stored in the mapping table storage area 701, and updates the mapping information into the logical address-physical address mapping table.

In the present exemplary embodiment, the first threshold may be set as the size of the updated mapping information corresponding to one physical erasing unit among programmed physical erasing units stored in the mapping table storage area 701. For example, the one programmed physical erasing unit is a last one of the programmed physical erasing units before the new active physical erasing unit is selected.

In the present exemplary embodiment, if the physical erasing unit 410(0) is fully written and the physical erasing unit 410(1) is selected as the new active physical erasing unit, the memory control circuit unit 404 (or the memory management circuit 502) calculates that the size of updated mapping information UM0 corresponding to the programmed physical erasing unit 410(0) stored in the mapping table storage area 701 is 1 unit and the remaining storage space of the mapping table storage area 701 is 3 units. At this time, the last one of the programmed physical erasing units before selecting the new active physical erasing unit is the physical erasing unit 410(0). Therefore, the memory control circuit unit 404 (or the memory management circuit 502) sets the size of the updated mapping information UM0 (i.e., 1 unit) corresponding to the physical erasing unit 410(0) as the first threshold. Further, the memory control circuit unit 404 (or the memory management circuit 502) determines that the remaining storage space of the mapping table storage area 701 (i.e., 3 units) is not less than the first threshold (i.e., 1 unit), such that it is not required to update the logical address-physical address mapping table. In other words, the updated mapping information of the new active physical erasing unit may be stored into the mapping table storage area 701.

Referring to FIG. 7B, the memory control circuit unit 404 (or the memory management circuit 502) selects the physical erasing unit 410(1) as the active physical erasing unit, and programs the data into the physical erasing unit 410(1). The memory control circuit unit 404 (or the memory management circuit 502) establishes updated mapping information according to mapping relations between the programmed physical programming units in the physical erasing unit 410(1) and the logical programming units to which the data belongs, and stores the updated mapping information into the mapping table storage area. If the physical erasing unit 410(1) is fully written, the memory control circuit unit 404 (or the memory management circuit 502) calculates that the size of updated mapping information UM1 corresponding to the programmed physical erasing unit 410(1) stored in the mapping table storage area 701 is 1.5 unit.

At this time, the mapping table storage area 701 is stored with the updated mapping information UM0 corresponding to the physical erasing unit 410(0) and the updated mapping information UM1 corresponding to the physical erasing unit 410(1), wherein the size of the updated mapping information UM0 is 1 unit, and the size of the updated mapping information UM1 is 1.5 units. The memory control circuit unit 404 (or the memory management circuit 502) then calculates that the remaining storage space of the mapping table storage area 701 is 1.5 units. The last one of the programmed physical erasing units before selecting the new active physical erasing unit is the physical erasing unit 410(1). Therefore, the memory control circuit unit 404 (or the memory management circuit 502) sets the size of the updated mapping information UM1 (i.e., 1.5 units) corresponding to the physical erasing unit 410(1) as the first threshold. Further, the memory control circuit unit 404 (or the memory management circuit 502) determines that the remaining storage space (i.e., 1.5 units) is not less than the first threshold (i.e., 1.5 units), such that the logical address-physical address mapping table is not updated. In other words, the updated mapping information of the new active physical erasing unit may be stored into the mapping table storage area 701.

Referring to FIG. 7C, the memory control circuit unit 404 (or the memory management circuit 502) selects the physical erasing unit 410(2) as the active physical erasing unit, and programs the data into the physical erasing unit 410(2). The memory control circuit unit 404 (or the memory management circuit 502) establishes updated mapping information according to mapping relations between the programmed physical programming units in the physical erasing unit 410(2) and the logical programming units to which the data belongs, and stores the updated mapping information into the mapping table storage area 701. If the physical erasing unit 410(2) is fully written, the memory control circuit unit 404 (or the memory management circuit 502) calculates that a size of updated mapping information UM2 corresponding to the programmed physical erasing unit 410(2) stored in the mapping table storage area 701 is 1 unit.

At this time, the mapping table storage area 701 is stored with the updated mapping information UM0 corresponding to the physical erasing unit 410(0), the updated mapping information UM1 corresponding to the physical erasing unit 410(1) and the updated mapping information UM2 corresponding to the physical erasing unit 410(2), wherein the size of the updated mapping information UM0 is 1 unit, the size of the updated mapping information UM1 is 1.5 units, and the size of the updated mapping information UM2 is 1 unit. The memory control circuit unit 404 (or the memory management circuit 502) then calculates that the remaining storage space of the mapping table storage area 701 is 0.5 unit. The last one of the programmed physical erasing units before selecting the new active physical erasing unit is the physical erasing unit 410(2). Therefore, the memory control circuit unit 404 (or the memory management circuit 502) sets the size of the updated mapping information UM1 (i.e., 1 unit) corresponding to the physical erasing unit 410(2) as the first threshold. Further, the memory control circuit unit 404 (or the memory management circuit 502) determines that the remaining storage space (i.e., 0.5 unit) is less than the first threshold (i.e., 1 unit), such that it is required to update the logical address-physical address mapping table. In other words, the mapping table storage area 701 may not be able to completely store the updated mapping information corresponding to one new active physical erasing unit, such that it is required to store the mapping information of the physical address-logical address mapping table stored in the mapping table storage area 701 into the logical address-physical address mapping table, and clear the mapping information of the physical address-logical address mapping table stored in the mapping table storage area 701.

In another exemplary embodiment, the first threshold may also be set as a maximal value among sizes of the updated mapping information corresponding to the programmed physical erasing units stored in the mapping table storage area.

For example, referring to FIG. 7A, at this time, the mapping table storage area 701 is only stored with the updated mapping information UM0 corresponding to the physical erasing unit 410(0), wherein the size of the updated mapping information UM0 is 1 unit, and the remaining storage space of the mapping table storage area 701 is 3 units. The memory control circuit unit 404 (or the memory management circuit 502) identifies that the size of the updated mapping information UM0 corresponding to the physical erasing unit 410(0) among the sizes of the updated mapping information corresponding to the programmed physical erasing units is the maximal value. Therefore, the memory control circuit unit 404 (or the memory management circuit 502) sets the size of the updated mapping information UM0 (i.e., 1 unit) corresponding to the physical erasing unit 410(0) as the first threshold. Further, the memory control circuit unit 404 (or the memory management circuit 502) determines that the remaining storage space of the mapping table storage area 701 (i.e., 3 units) is not less than the first threshold (i.e., 1 unit), such that the logical address-physical address mapping table is not updated.

For example, referring to FIG. 7B, at this time, the mapping table storage area 701 is stored with the updated mapping information UM0 corresponding to the physical erasing unit 410(0) and the updated mapping information UM1 corresponding to the physical erasing unit 410(1), wherein the size of the updated mapping information UM0 is 1 unit, the size of the updated mapping information UM1 is 1.5 units, and the remaining storage space of the mapping table storage area 701 is 1.5 units. The memory control circuit unit 404 (or the memory management circuit 502) identifies that the size of the updated mapping information UM1 corresponding to the physical erasing unit 410(1) among the sizes of the updated mapping information corresponding to the programmed physical erasing units is the maximal value. Therefore, the memory control circuit unit 404 (or the memory management circuit 502) sets the size of the updated mapping information UM1 (i.e., 1.5 units) corresponding to the physical erasing unit 410(1) as the first threshold. Further, the memory control circuit unit 404 (or the memory management circuit 502) determines that the remaining storage space of the mapping table storage area 701 (i.e., 1.5 units) is not less than the first threshold (i.e., 1.5 units), such that the logical address-physical address mapping table is not updated.

For example, referring to FIG. 7C, at this time, the mapping table storage area 701 is stored with the updated mapping information UM0 corresponding to the physical erasing unit 410(0), the updated mapping information UM1 corresponding to the physical erasing unit 410(1) and the updated mapping information UM2 corresponding to the physical erasing unit 410(2), wherein the size of the updated mapping information UM0 is 1 unit, the size of the updated mapping information UM1 is 1.5 units, the size of the updated mapping information UM2 is 1 unit, and the remaining storage space of the mapping table storage area 701 is 0.5 unit. The memory control circuit unit 404 (or the memory management circuit 502) identifies that the size of the updated mapping information UM1 corresponding to the physical erasing unit 410(1) among the sizes of the updated mapping information corresponding to the programmed physical erasing units is the maximal value. Therefore, the memory control circuit unit 404 (or the memory management circuit 502) sets the size of the updated mapping information UM1 (i.e., 1.5 units) corresponding to the physical erasing unit 410(1) as the first threshold. Further, the memory control circuit unit 404 (or the memory management circuit 502) determines that the remaining storage space (i.e., 0.5 unit) of the mapping table storage area 701 is less than the first threshold (i.e., 1.5 units), stores the mapping information of the physical address-logical address mapping table stored in the mapping table storage area 701 into the logical address-physical address mapping table, and clears the mapping information of the physical address-logical address mapping table stored in the mapping table storage area 701.

In the foregoing exemplary embodiments, the first threshold is set as the size of the updated mapping information corresponding to one physical erasing unit among the programmed physical erasing units stored in the mapping table storage area 701. However, in another exemplary embodiment, the first threshold may also be set as an average value of the sizes of the updated mapping information corresponding to the programmed physical erasing units stored in the mapping table storage area.

For example, referring to FIG. 7A, at this time, the mapping table storage area 701 is only stored with the updated mapping information UM0 corresponding to the physical erasing unit 410(0), wherein the size of the updated mapping information UM0 is 1 unit, and the remaining storage space of the mapping table storage area 701 is 3 units. The memory control circuit unit 404 (or the memory management circuit 502) calculates that the average value of the sizes of the updated mapping information corresponding to the programmed physical erasing units is 1 unit, and sets the first threshold as 1 unit. Further, the memory control circuit unit 404 (or the memory management circuit 502) determines that the remaining storage space of the mapping table storage area 701 (i.e., 3 units) is not less than the first threshold (i.e., 1 unit), such that the logical address-physical address mapping table is not updated.

For example, referring to FIG. 7B, at this time, the mapping table storage area 701 is stored with the updated mapping information UM0 corresponding to the physical erasing unit 410(0) and the updated mapping information UM1 corresponding to the physical erasing unit 410(1), wherein the size of the updated mapping information UM0 is 1 unit, the size of the updated mapping information UM1 is 1.5 units, and the remaining storage space of the mapping table storage area 701 is 1.5 units. The memory control circuit unit 404 (or the memory management circuit 502) calculates that the average value of the sizes of the updated mapping information corresponding to the programmed physical erasing units is 1.25 units, and sets the first threshold as 1.25 units. Further, the memory control circuit unit 404 (or the memory management circuit 502) determines that the remaining storage space of the mapping table storage area 701 (i.e., 1.5 units) is not less than the first threshold (i.e., 1.25 units), such that the logical address-physical address mapping table is not updated.

For example, referring to FIG. 7C, at this time, the mapping table storage area 701 is stored with the updated mapping information UM0 corresponding to the physical erasing unit 410(0), the updated mapping information UM1 corresponding to the physical erasing unit 410(1) and the updated mapping information UM2 corresponding to the physical erasing unit 410(2), wherein the size of the updated mapping information UM0 is 1 unit, the size of the updated mapping information UM1 is 1.5 units, the size of the updated mapping information UM2 is 1 unit, and the remaining storage space of the mapping table storage area 701 is 0.5 unit. The memory control circuit unit 404 (or the memory management circuit 502) calculates that the average value of the sizes of the updated mapping information corresponding to the programmed physical erasing units is 1.17 units, and sets the first threshold as 1.17 units. Further, the memory control circuit unit 404 (or the memory management circuit 502) determines that the remaining storage space (i.e., 0.5 unit) of the mapping table storage area 701 is less than the first threshold (i.e., 1.17 units), stores the mapping information of the physical address-logical address mapping table stored in the mapping table storage area 701 into the logical address-physical address mapping table, and clears the mapping information of the physical address-logical address mapping table stored in the mapping table storage area 701.

The invention uses the sizes of the mapping information corresponding to the programmed physical erasing units stored in the mapping table storage area to estimate whether the remaining storage space of the mapping table storage area is capable of completely storing the updated mapping information of one new active physical erasing unit. However, if the size of the updated mapping information of the new active physical erasing unit is not as expected (i.e, greater than the remaining storage space of the mapping table storage area), a situation may occur where the mapping table storage area is already fully written after storing only a part of the updated mapping information corresponding to the new active physical erasing unit while the active physical erasing unit is not fully written.

Figure 8:
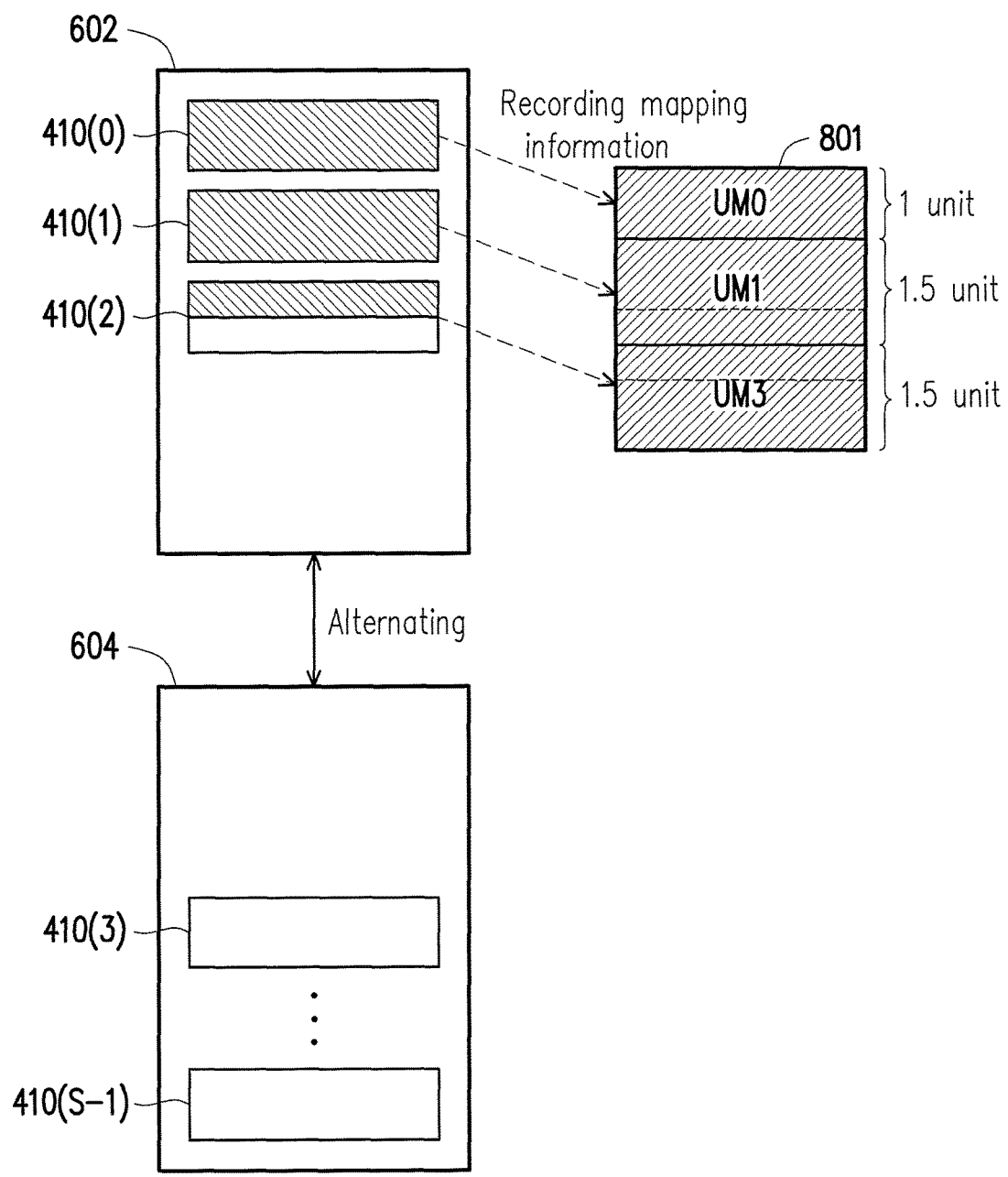
FIG. 8 is a schematic diagram illustrating an example of storing a part of the updated mapping information of the active physical erasing unit into the mapping table storage area according to an exemplary embodiment.

FIG. 8 is a schematic diagram illustrating an example of storing a part of the updated mapping information of the active physical erasing unit into the mapping table storage area according to an exemplary embodiment.

Referring to FIG. 8, the physical erasing unit 410(0) and the physical erasing unit 410(1) are the programmed physical erasing units. If the physical erasing unit 410(0) and the physical erasing units 410(1) are fully written, a mapping table storage area 801 is stored with the updated mapping information UM0 corresponding to the physical erasing unit 410(0) and the updated mapping information UM1 corresponding to the physical erasing unit 410(1), wherein the size of the updated mapping information UM0 is 1 unit, the size of the updated mapping information UM1 is 1.5 units, and the remaining storage space is 1.5 units. The memory control circuit unit 404 (or the memory management circuit 502) selects the physical erasing unit 410(2) as the active physical programming unit. Therefore, the memory control circuit unit 404 (or the memory management circuit 502) sets the size of the updated mapping information (i.e., 1.5 units) corresponding to the programmed physical erasing unit 410(1) (i.e., the last one of the programmed physical erasing units before selecting the new active physical erasing unit) as the first threshold. Further, the memory control circuit unit 404 (or the memory management circuit 502) determines that the remaining storage space of the mapping table storage area 801 (i.e., 1.5 units) is not less than the first threshold (i.e., 1.5 units), such that the logical address-physical address mapping table is not updated. Accordingly, the memory control circuit unit 404 (or the memory management circuit 502) programs the data into the physical erasing unit 410(2), establishes updated mapping information according to mapping relations between the programmed physical programming units in the physical erasing unit 410(2) and the logical programming units to which the data belongs, and stores the updated mapping information into the mapping table storage area 801.

In the present exemplary embodiment, the memory control circuit unit 404 (or the memory management circuit 502) may further determine whether the remaining storage space of the mapping table storage area 801 is not greater than a second threshold, so as to determine whether the physical programming units that can be sequentially programmed in the active physical erasing unit (i.e., the physical erasing unit 410(2)) are the upper physical programming units. The second threshold may be smaller than the first threshold or equal to zero (i.e., the mapping table storage area 801 is fully written), or may be set based on actual requirements, which is not particularly limited in the invention. Hereinafter, the description is provided by using an example in which the second threshold is zero.

In the present exemplary embodiment, practically, if the physical erasing unit 410(2) is fully written, the size of updated mapping information established according to a mapping relation between the physical programming units programmed in the physical erasing unit 410(2) and the logical programming units to which the data belongs is 2 units, but the remaining storage space of the mapping table storage table 801 is only enough to store the updated mapping information with the size of 1.5 units. Therefore, the mapping table storage area 801 is already fully written after only storing a part of the updated mapping information UM3 corresponding to the physical erasing unit 410(2) (i.e., a size of the part of the updated mapping information UM3 is 1.5 units) while the physical erasing unit 410(2) is not fully written.

If the mapping table storage area 801 is fully written (i.e., if the remaining storage space of the mapping table storage area 801 is not enough to store the updated mapping information), it is required to update the mapping information of the physical address-logical address mapping table stored in the mapping table storage area 801 into the logical address-physical address mapping table, and clear the mapping information of the physical address-logical address mapping table stored in the mapping table storage area 801. However, because the active physical erasing unit (i.e., the physical erasing unit 410(2)) is not fully written, before updating the logical address-physical address mapping table, the memory control circuit unit 404 (or the memory management circuit 502) first determines whether the physical programming units that can be sequentially programmed in the active physical erasing unit (i.e., the physical erasing unit 410(2)) are the upper physical programming units. Specifically, the memory control circuit unit 404 (or the memory management circuit 502) determines whether a lower physical programming unit programmed with valid data exists in the active physical erasing unit (i.e., the physical erasing unit 410(2)), and an upper physical programming unit corresponding to the lower physical programming unit is not programmed. If determining that the lower physical programming unit exists in the active physical erasing unit (i.e., the physical erasing unit 410(2)) the memory control circuit unit 404 (or the memory management circuit 502) programs dummy data into the upper physical programming unit corresponding to the lower physical programming unit.

Figure 9:
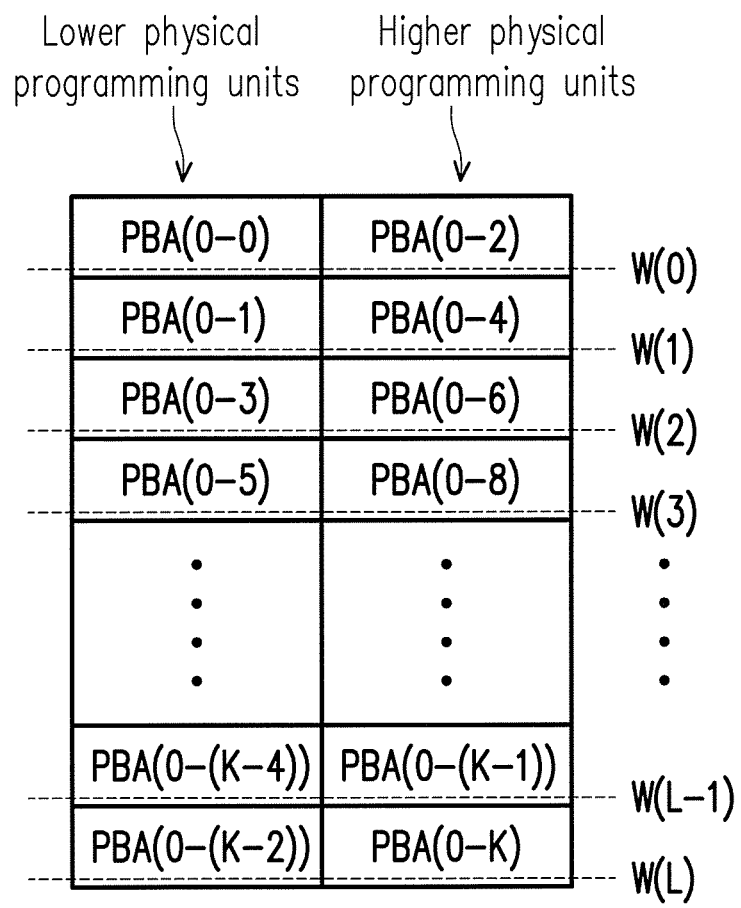
FIG. 9 is a schematic diagram illustrating an arrangement sequence of the physical programming units according to an exemplary embodiment.

FIG. 9 is a schematic diagram illustrating an arrangement sequence of the physical programming units according to an exemplary embodiment. Herein, a physical erasing unit 410(2) is described herein as an example for description, and structures of the rest of the physical erasing units may also be deduced by analogy.

Referring to FIG. 9, the physical erasing unit 410(2) includes a plurality of physical programming units PBA(0-0) to PBA(0-K). In the present exemplary embodiment, K is an integer for example. For instance, K is 255. In this case, the physical programming unit PBA(0-0) and the physical programming unit PBA(0-2) are formed by memory cells disposed in a word line W(0); the physical programming unit PBA(0-1) and the physical programming unit PBA(0-4) are formed by memory cells disposed in a word line W(1); the physical programming unit PBA(0-3) and the physical programming unit PBA(0-6) are formed by memory cells disposed in a word line W(2); the physical programming unit PBA(0-5) and the physical programming unit PBA(0-8) are formed by memory cells disposed in a word line W(3); and the rest may be deduced by analogy, that is, the physical programming unit PBA(0-(K−4)) and the physical programming unit PBA(0-(K−1)) are formed by memory cells disposed in a word line W(L−1), and the physical programming unit PBA(0-(K−2)) and the physical programming unit PBA(0-K) are formed by memory cells disposed in a word line W(L). Herein, the physical programming units PBA(0-0), PBA(0-1), PBA(0-3), PBA(0-5), . . . , PBA(0-(K−4)), PBA(0-(K−2)) are the lower physical programming units, and the physical programming units PBA(0-2), PBA(0-4), PBA(0-6), PBA(0-8), . . . , PBA(0-(K−1)), PBA(0-K) are the upper physical programming units.

Figure 10A:
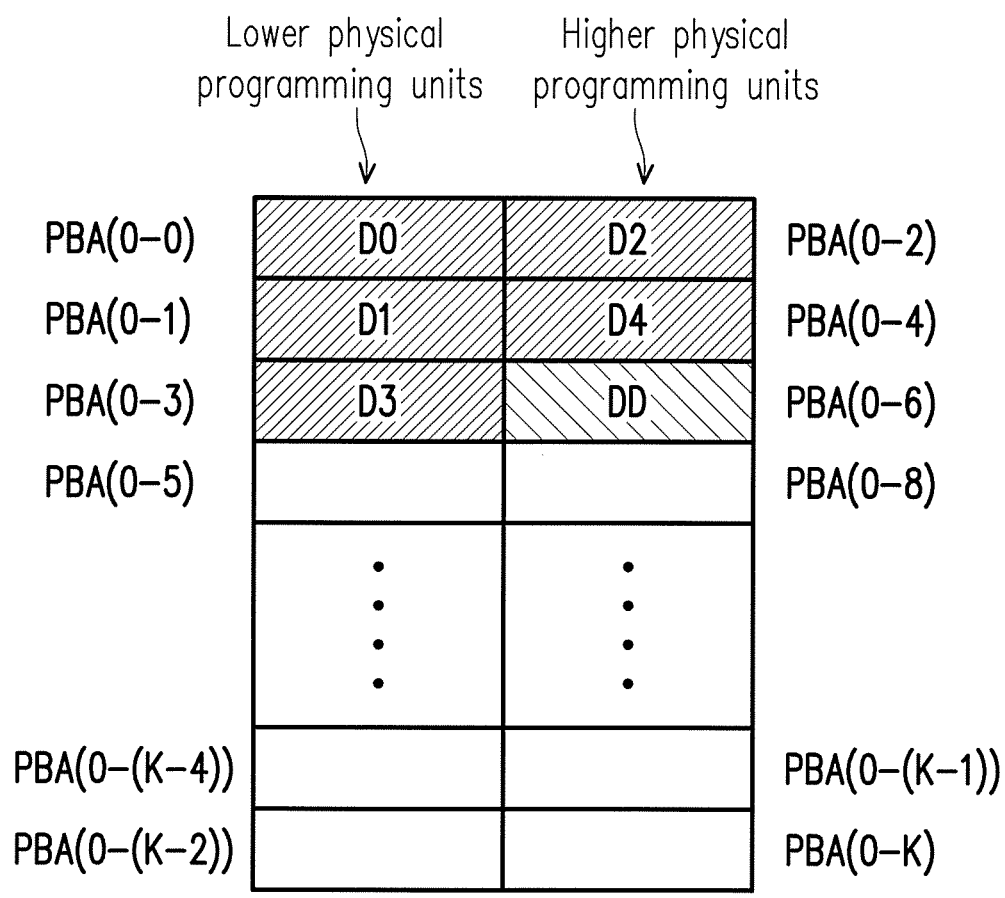
FIG. 10A and FIG. 10B are schematic diagrams illustrating an example of programming the dummy data into the upper physical programming unit of the active physical erasing unit according to an exemplary embodiment.
Figure 10B:
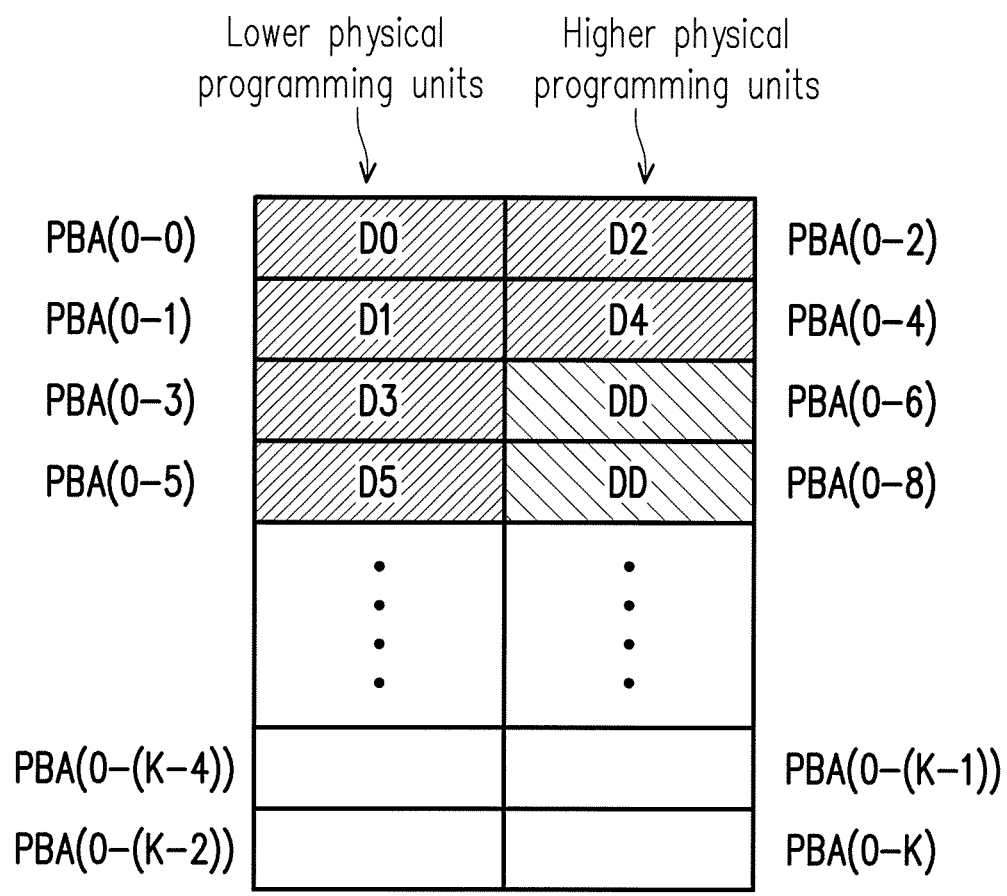

FIG. 10A and FIG. 10B are schematic diagrams illustrating an example of programming the dummy data into the upper physical programming unit of the active physical erasing unit according to an exemplary embodiment.

Referring to FIG. 10A, if the mapping table storage area 801 is fully written, the physical programming units programmed with the valid data in the active physical erasing unit (i.e., the physical erasing unit 410(2)) are the lower physical programming units PBA(0-0), PBA(0-1) and PBA(0-3) and the upper physical programming units PBA(0-2) and PBA(0-4). Herein, the memory control circuit unit 404 (or the memory management circuit 502) determines that the upper physical programming unit PBA(0-6) corresponding to the lower physical programming unit PBA(0-3) of the physical erasing unit 410(2) is not programmed. Accordingly, after programming the dummy data into the upper physical programming unit PBA(0-6) of the physical erasing unit 410(2), the memory control circuit unit 404 (or the memory management circuit 502) updates the mapping information of the physical address-logical address mapping table stored in the mapping table storage area 801 into the logical address-physical address mapping table, and clears the mapping information of the physical address-logical address mapping table stored in the mapping table storage area 801.

Referring to FIG. 10B, in another exemplary embodiment, if the mapping table storage area 801 is fully written, the physical programming units programmed with the valid data in the active physical erasing unit (i.e., the physical erasing unit 410(2)) are the lower physical programming units PBA(0-0), PBA(0-1), PBA(0-3) and PBA(0-5) and the upper physical programming units PBA(0-2) and PBA(0-4). Herein, the memory control circuit unit 404 (or the memory management circuit 502) determines that both the upper physical programming unit PBA(0-6) corresponding to the lower physical programming unit PBA(0-3) and the upper physical programming unit PBA(0-8) corresponding to the lower physical programming unit PBA(0-5) of the physical erasing unit 410(2) are not programmed. Accordingly, after programming the dummy data into the upper physical programming unit PBA(0-6) and the upper physical programming unit PBA(0-8) of the physical erasing unit 410(2), the memory control circuit unit 404 (or the memory management circuit 502) updates the mapping information of the physical address-logical address mapping table stored in the mapping table storage area 801 into the logical address-physical address mapping table, and clears the mapping information of the physical address-logical address mapping table stored in the mapping table storage area 801.

Figure 11:
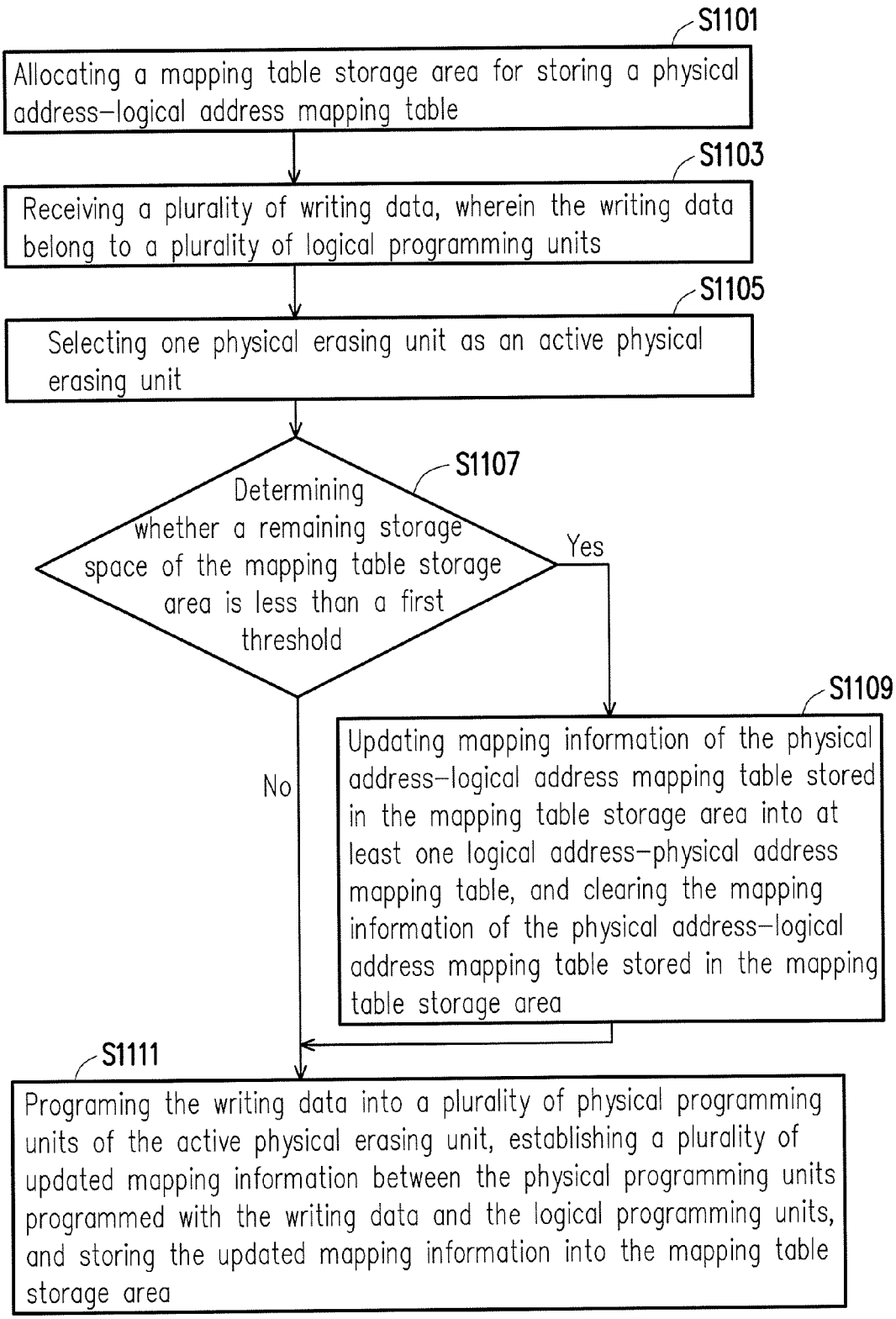
FIG. 11 is a flowchart illustrating a mapping table updating method according to an exemplary embodiment.

FIG. 11 is a flowchart illustrating a mapping table updating method according to an exemplary embodiment.

Referring to FIG. 11, in step S1101, the memory control circuit unit 404 (or the memory management circuit 502) allocates a mapping table storage area for storing a physical address-logical address mapping table. Specifically, the memory control circuit unit 404 (or the memory management circuit 502) allocates the mapping table storage area in the buffer memory 508.

In step S1103, the memory control circuit unit 404 (or the memory management circuit 502) receives a plurality of writing data from the host system 11, and the writing data belong to a plurality of logical programming units.

In step S1105, the memory control circuit unit 404 (or the memory management circuit 502) selects one physical erasing unit as an active physical erasing unit. Specifically, the memory control circuit unit 404 (or the memory management circuit 502) selects one among a plurality of physical erasing units from the rewritable non-volatile memory module 406 as the active physical erasing unit.

In step S1107, the memory control circuit unit 404 (or the memory management circuit 502) determines whether a remaining storage space of the mapping table storage area is less than a first threshold. The threshold value may be different values based on actual requirements, which have been described in the foregoing embodiments and will not be repeated hereinafter.

If the remaining storage space of the mapping table storage area is less than the first threshold, in step S1109, the memory control circuit unit 404 (or the memory management circuit 502) updates mapping information of the physical address-logical address mapping table stored in the mapping table storage area into at least one logical address-physical address mapping table, and clears the mapping information of the physical address-logical address mapping table stored in the mapping table storage area. The memory control circuit unit 404 (or the memory management circuit 502) may clear the mapping information of the physical address-logical address mapping table stored in the mapping table storage area immediately after updating the mapping information into the at least one logical address-physical address mapping table. Nonetheless, the memory control circuit unit 404 (or the memory management circuit 502) may also perform said clearing operation at any time point before next time the active physical erasing unit is programmed, which is not particularly limited in the invention.

In step S1111, the memory control circuit unit 404 (or the memory management circuit 502) programs the writing data into a plurality of physical programming units of the active physical erasing unit, establishes a plurality of updated mapping information between the physical programming units programmed with the writing data and the logical programming units, and stores the updated mapping information into the mapping table storage area. Specifically, in step S1107, if determining that the remaining storage space of the mapping table storage area is not less than the first threshold, the memory control circuit unit 404 (or the memory management circuit 502) directly performs step S1111. In contrast, in step S1107, if determining that the remaining storage space of the mapping table storage area is less than the first threshold, the memory control circuit unit 404 (or the memory management circuit 502) performs step S1109 first before performing step S1111. It should be noted that, in the present exemplary embodiment, whether the remaining storage space of the mapping table storage area is less than the first threshold is determined first before programming the writing data into the active physical erasing unit. Nevertheless, in another exemplary embodiment, whether the remaining storage space of the mapping table storage area is less than the first threshold may also be determined after programming the writing data into the active physical erasing unit, which is not particularly limited in the invention.

Figure 12:
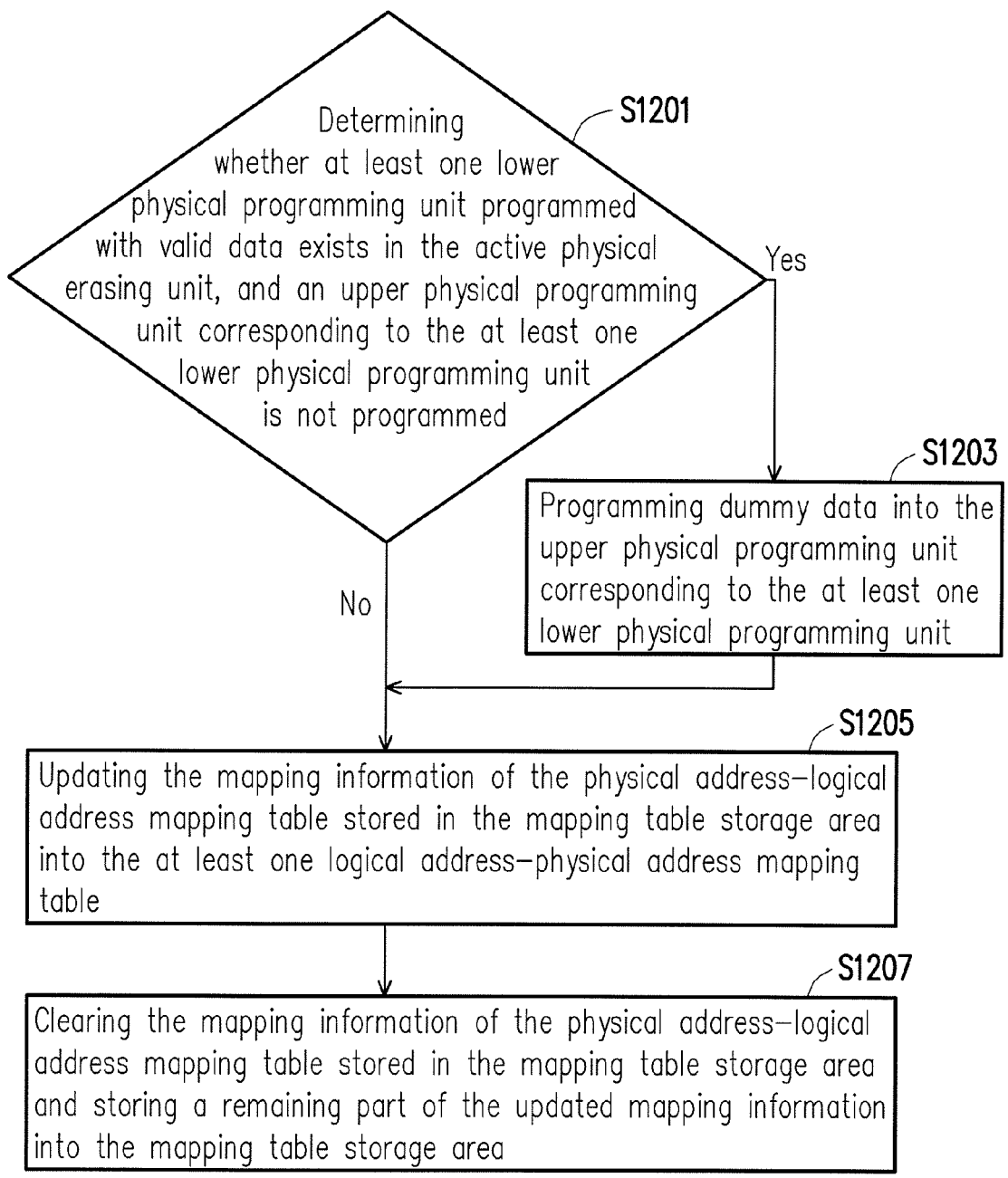
FIG. 12 is a flowchart illustrating a mapping table updating method according to another exemplary embodiment.

FIG. 12 is a flowchart illustrating a mapping table updating method according to another exemplary embodiment of the invention. FIG. 12 is a flowchart illustrating an example of step for storing the updated mapping information into the mapping table storage area of FIG. 11.

Referring FIG. 12, if only a part of the updated mapping information is stored into the mapping table storage area and the physical address-logical address mapping table is not greater than a second threshold in the step of storing the updated mapping information of the active physical erasing unit into the mapping table storage area, in step S1201, the memory control circuit unit 404 (or the memory management circuit 502) determines whether at least one lower physical programming unit programmed with valid data exists in the active physical erasing unit, and an upper physical programming unit corresponding to the at least one lower physical programming unit is not programmed.

If determining that the at least one lower physical erasing unit exists in the active physical erasing unit, in step S1203, the memory control circuit unit 404 (or the memory management circuit 502) programs dummy data into the upper physical programming unit corresponding to the at least one lower physical programming unit.

In step S1205, the memory control circuit unit 404 (or the memory management circuit 502) updates the mapping information of the physical address-logical address mapping table stored in the mapping table storage area into the at least one logical address-physical address mapping table. Specifically, in step S1201, if determining that the at least one lower physical programming unit does not exist, the memory control circuit unit 404 (or the memory management circuit 502) directly performs step S1205. In contrast, in step S1201, if determining that the at least one lower physical programming unit exists, the memory control circuit unit 404 (or the memory management circuit 502) performs step S1203 first before performing the step S1205.

In step S1207, the memory control circuit unit 404 (or the memory management circuit 502) clears the mapping information of the physical address-logical address mapping table stored in the mapping table storage area, and stores a remaining part of the updated mapping information into the mapping table storage area.

In summary, according to the mapping table updating method, the memory control circuit unit and the memory storage device proposed by the exemplary embodiments of the invention, the mapping table storage area is used to store the updated mapping information of the physical address-logical address mapping table corresponding to the active physical erasing unit, and whether to update the mapping information of the physical address-logical address mapping table stored in the mapping table storage area into the logical address-physical address mapping table is determined according to the size of the remaining storage space of the mapping table storage area. In the case where the active physical erasing unit is not fully written but it is required to update the mapping information of the physical address-logical address mapping table stored in the mapping table storage area into the logical address-physical address mapping table, if determining that the physical programming units that can be sequentially programmed with the data are the upper physical programming units, the dummy data is written into the upper physical programming units. Accordingly, the efficiency for updating the logical address-physical address mapping table may be improved while preventing the situation where the programmed data cannot be restored due to the programming failures of other physical programming units after updating the logical address-physical address mapping table.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mapping table updating method for a memory storage device having a rewritable non-volatile memory module, wherein the rewritable non-volatile memory module has a plurality of physical erasing units, and each of the physical erasing units has a plurality of physical programming units, the mapping table updating method comprising:

allocating a mapping table storage area for storing a physical address-logical address mapping table in a buffer memory;

determining whether a remaining storage space of the mapping table storage area is less than a first threshold;

if the remaining storage space is less than the first threshold, updating mapping information of the physical address-logical address mapping table stored in the mapping table storage area into at least one logical address-physical address mapping table;

clearing the mapping information of the physical address-logical address mapping table stored in the mapping table storage area; and programming a plurality of writing data belonging to a plurality of logical programming units into the physical programming units of an active physical erasing unit among the physical erasing units, establishing a plurality of updated mapping information between the physical programming units programmed with the writing data and the logical programming units, and storing the updated mapping information into the physical address-logical address mapping table in the mapping table storage area, wherein the logical address-physical address mapping table records a mapping relation between the logical programming units and the physical erasing units, and the physical address-logical address mapping table records a mapping relation between the programmed active physical erasing unit and the logical programming units.

2. The mapping table updating method of claim 1, wherein the step of storing the updated mapping information into the physical address-logical address mapping table in the mapping table storage area comprises:

if a part of the updated mapping information is stored into the mapping table storage area and the remaining storage space of the mapping table storage area is not greater than a second threshold, determining whether at least one first physical programming unit exists in the active physical erasing unit, wherein the at least one first physical programming unit is a lower physical programming unit, and the at least one first physical programming unit is programmed with valid data while an upper physical programming unit corresponding to the at least one first physical programming unit is not programmed;

if the at least one first physical programming unit exists in the active physical erasing unit, programming dummy data into the upper physical programming unit corresponding to the at least one first physical programming unit;

after programming the dummy data into the upper physical programming unit corresponding to the at least one first physical programming unit, updating the mapping information of the physical address-logical address mapping table stored in the mapping table storage area into the at least one logical address-physical address mapping table; and clearing the mapping information of the physical address-logical address mapping table stored in the mapping table storage area and storing a remaining part of the updated mapping information into the mapping table storage area.

3. The mapping table updating method of claim 1, wherein the mapping table storage area is stored with a plurality of updated mapping information corresponding to a plurality of programmed physical erasing units.

4. The mapping table updating method of claim 3, further comprising:

calculating the size of the updated mapping information corresponding to one of the programmed physical erasing units, wherein the one of the programmed physical erasing units is a last one of the programmed physical erasing units before programming the writing data into the physical programming units of the active physical erasing unit; and setting the size of the updated mapping information corresponding to the one of the programmed physical erasing units as the first threshold.

5. The mapping table updating method of claim 3, further comprising:

calculating the size of the updated mapping information corresponding to each of the programmed physical erasing units;

calculating an average value of the sizes of the updated mapping information corresponding to the programmed physical erasing units; and setting the average value as the first threshold.

6. The mapping table updating method of claim 3, further comprising:

calculating the size of the updated mapping information corresponding to each of the programmed physical erasing units;

identifying a maximal value among the sizes of the updated mapping information corresponding to the programmed physical erasing units; and setting the maximal value as the first threshold.

7. The mapping table updating method of claim 1, wherein at least one part of data among the writing data is data generated by compressing a plurality of original data received from a host system.

8. A memory control circuit unit for controlling a rewritable non-volatile memory module, wherein the rewritable non-volatile memory module has a plurality of physical erasing units, each of the physical erasing units has a plurality of physical programming units, the memory control circuit unit comprising:

a host interface configured to couple to a host system;

a memory interface configured to couple to the rewritable non-volatile memory module; and a memory management circuit coupled to the host interface and the memory interface, wherein the memory management circuit is configured to allocate a mapping table storage area for storing a physical address-logical address mapping table in a buffer memory, wherein the memory management circuit is further configured to determine whether a remaining storage space of the mapping table storage area is less than a first threshold, wherein if the remaining storage space is less than the first threshold, the memory management circuit is further configured to update mapping information of the physical address-logical address mapping table stored in the mapping table storage area into at least one logical address-physical address mapping table, wherein the memory management circuit is further configured to clear the mapping information of the physical address-logical address mapping table stored in the mapping table storage area, wherein the memory management circuit is further configured to program a plurality of writing data belonging to a plurality of logical programming units into the physical programming units of an active physical erasing unit among the physical erasing units, establish a plurality of updated mapping information between the physical programming units programmed with the writing data and the logical programming units, and store the updated mapping information into the physical address-logical address mapping table in the mapping table storage area, wherein the logical address-physical address mapping table records a mapping relation between the logical programming units and the physical erasing units, and the physical address-logical address mapping table records a mapping relation between the programmed active physical erasing unit and the logical programming units.

9. The memory control circuit unit of claim 8, wherein if a part of the updated mapping information is stored into the mapping table storage area and the remaining storage space of the mapping table storage area is not greater than a second threshold, the memory management circuit is further configured to determine whether at least one first physical programming unit exists in the active physical erasing unit, wherein the at least one first physical programming unit is a lower physical programming unit, and the at least one first physical programming unit is programmed with valid data while an upper physical programming unit corresponding to the at least one first physical programming unit is not programmed, wherein if the at least one first physical programming unit exists in the active physical erasing unit, the memory management circuit is further configured to program dummy data into the upper physical programming unit corresponding to the at least one first physical programming unit, wherein after programming the dummy data into the upper physical programming unit corresponding to the at least one first physical programming unit, the memory management circuit is further configured to update the mapping information of the physical address-logical address mapping table stored in the mapping table storage area into the at least one logical address-physical address mapping table, wherein the memory management circuit is further configured to clear the mapping information of the physical address-logical address mapping table stored in the mapping table storage area and store a remaining part of the updated mapping information into the mapping table storage area.

10. The memory control circuit unit of claim 8, wherein the mapping table storage area is stored with a plurality of updated mapping information corresponding to a plurality of programmed physical erasing units.

11. The memory control circuit unit of claim 10, wherein the memory management circuit is further configured to calculate the size of the updated mapping information corresponding to one of the programmed physical erasing units, wherein the one of the programmed physical erasing units is a last one of the programmed physical erasing units before programming the writing data into the physical programming units of the active physical erasing unit, wherein the memory management circuit is further configured to set the size of the updated mapping information corresponding to the one of the programmed physical erasing units as the first threshold.

12. The memory control circuit unit of claim 10, wherein the memory management circuit is further configured to calculate the size of the updated mapping information corresponding to each of the programmed physical erasing units, wherein the memory management circuit is further configured to calculate an average value of the sizes of the updated mapping information corresponding to the programmed physical erasing units, wherein the memory management circuit is further configured to set the average value as the first threshold.

13. The memory control circuit unit of claim 10, wherein the memory management circuit is further configured to calculate the size of the updated mapping information corresponding to each of the programmed physical erasing units, wherein the memory management circuit is further configured to identify a maximal value among the sizes of the updated mapping information corresponding to the programmed physical erasing units, wherein the memory management circuit is further configured to set the maximal value as the first threshold.

14. The memory control circuit unit of claim 8, wherein at least one part of data among the writing data is data generated by compressing a plurality of original data received from the host system by the memory management circuit.

15. A memory storage device, comprising:

a connection interface unit configured to couple to a host system;

a rewritable non-volatile memory module having a plurality of physical erasing units, wherein each of the physical erasing units has a plurality of physical programming units; and a memory control circuit unit coupled to the connection interface unit and the rewritable non-volatile memory module, wherein the memory control circuit unit is configured to allocate a mapping table storage area for storing a physical address-logical address mapping table in a buffer memory, wherein the memory control circuit unit is further configured to determine whether a remaining storage space of the mapping table storage area is less than a first threshold, wherein if the remaining storage space is less than the first threshold, the memory control circuit unit is further configured to update mapping information of the physical address-logical address mapping table stored in the mapping table storage area into at least one logical address-physical address mapping table, wherein the memory control circuit unit is further configured to clear the mapping information of the physical address-logical address mapping table stored in the mapping table storage area, wherein the memory control circuit unit is further configured to program a plurality of writing data belonging to a plurality of logical programming units into the physical programming units of an active physical erasing unit among the physical erasing units, establish a plurality of updated mapping information between the physical programming units programmed with the writing data are programmed and the logical programming units, and store the updated mapping information into the physical address-logical address mapping table in mapping table storage area, wherein the logical address-physical address mapping table records a mapping relation between the logical programming units and the physical erasing units, and the physical address-logical address mapping table records a mapping relation between the programmed active physical erasing unit and the logical programming units.

16. The memory storage device of claim 15, wherein when a part of the updated mapping information is stored into the mapping table storage area and the remaining storage space of the mapping table storage area is not greater than a second threshold, the memory control circuit unit is further configured to determine whether at least one first physical programming unit exists in the active physical erasing unit, wherein the at least one first physical programming unit is a lower physical programming unit, and the at least one first physical programming unit is programmed with valid data while an upper physical programming unit corresponding to the at least one first physical programming unit is not programmed, wherein if the at least one first physical programming unit exists in the active physical erasing unit, the memory control circuit unit is further configured to program dummy data into the upper physical programming unit corresponding to the at least one first physical programming unit, wherein after programming the dummy data into the upper physical programming unit corresponding to the at least one first physical programming unit, the memory control circuit unit is further configured to update the mapping information of the physical address-logical address mapping table stored in the mapping table storage area into the at least one logical address-physical address mapping table, wherein the memory control circuit unit is further configured to clear the mapping information of the physical address-logical address mapping table stored in the mapping table storage area and store a remaining part of the updated mapping information into the mapping table storage area.

17. The memory storage device of claim 15, wherein the mapping table storage area is stored with a plurality of updated mapping information corresponding to a plurality of programmed physical erasing units.

18. The memory storage device of claim 17, wherein the memory control circuit unit is further configured to calculate the size of the updated mapping information corresponding to the one of the programmed physical erasing units, wherein the one of the programmed physical erasing units is a last one of the programmed physical erasing units before programming the writing data into the physical programming units of the active physical erasing unit, wherein the memory control circuit unit is further configured to set the size of the updated mapping information corresponding to the one of the programmed physical erasing unit as the first threshold.

19. The memory storage device of claim 17, wherein the memory control circuit unit is further configured to calculate the size of the updated mapping information corresponding to each of the programmed physical erasing units, wherein the memory control circuit unit is further configured to calculate an average value of the sizes of the updated mapping information corresponding to the programmed physical erasing units, wherein the memory control circuit unit is further configured to set the average value as the first threshold.

20. The memory storage device of claim 17, wherein the memory control circuit unit is further configured to calculate the size of the updated mapping information corresponding to each of the programmed physical erasing units, wherein the memory control circuit unit is further configured to identify a maximal value among the sizes of the updated mapping information corresponding to the programmed physical erasing units, wherein the memory control circuit unit is further configured to set the maximal value as the first threshold.

21. The memory storage device of claim 15, wherein at least one part of data among the writing data is data generated by compressing a plurality of original data received from the host system by the memory control circuit unit.

* * * * *